United States Patent
Maresca

(10) Patent No.: US 10,333,968 B2
(45) Date of Patent: Jun. 25, 2019

(54) TECHNIQUES FOR DETECTING ATTACKS IN A PUBLISH-SUBSCRIBE NETWORK

(71) Applicant: Verisign Inc., Reston, VA (US)

(72) Inventor: Paolo Maresca, Fribourg (CH)

(73) Assignee: VERISIGN, INC., Reston, VA (US)

( * ) Notice: Subject to any disclaimer, the term of this patent is extended or adjusted under 35 U.S.C. 154(b) by 151 days.

(21) Appl. No.: 15/040,728

(22) Filed: Feb. 10, 2016

(65) Prior Publication Data

US 2017/0230413 A1 Aug. 10, 2017

(51) Int. Cl.
*H04L 29/06* (2006.01)
*G06N 7/00* (2006.01)
*G06F 21/55* (2013.01)

(52) U.S. Cl.
CPC ......... *H04L 63/1458* (2013.01); *G06N 7/005* (2013.01); *H04L 63/1408* (2013.01); *G06F 21/55* (2013.01)

(58) Field of Classification Search
CPC ............. H04L 63/1408; H04L 63/1416; H04L 63/1425; H04L 63/1458
See application file for complete search history.

(56) References Cited

U.S. PATENT DOCUMENTS

| | | | |
|---|---|---|---|
| 2005/0010753 A1* | 1/2005 | Marceau | H04L 63/1458 713/153 |
| 2007/0300300 A1 | 12/2007 | Guo et al. | |
| 2009/0126023 A1 | 5/2009 | Yun et al. | |
| 2010/0082513 A1* | 4/2010 | Liu | H04L 63/1458 706/46 |
| 2010/0281539 A1 | 11/2010 | Burns et al. | |
| 2012/0216282 A1* | 8/2012 | Pappu | H04L 63/1416 726/23 |
| 2014/0041028 A1* | 2/2014 | Ramsey | H04L 63/1408 726/22 |
| 2014/0222997 A1* | 8/2014 | Mermoud | H04L 41/142 709/224 |
| 2015/0106927 A1 | 4/2015 | Ferragut et al. | |

(Continued)

OTHER PUBLICATIONS

Avizienis, et al., "Dependability and its Threats: A Taxonomy", IEEE Transactions on Dependable and Secure Computing, pp. 91-120, 2004.

(Continued)

*Primary Examiner* — David J Pearson
(74) *Attorney, Agent, or Firm* — Artegis Law Group, LLP

(57) ABSTRACT

A publish-subscribe network includes a network infrastructure configured to support the exchange of data. An intrusion detection system is coupled to the network infrastructure and configured to process signals received from that infrastructure in order to detect malicious attacks on the network infrastructure. The intrusion detection system includes an evaluator that generates a set of indicators based on the received signals. The evaluator models these indicators as stochastic processes, and then predicts an attack probability for each indicator based on a predicted future state of each such indicator. The evaluator combines the various attack probabilities and determines an overall attack level for the network infrastructure. Based on the attack level, the intrusion detection system dispatches a specific handler to prevent or mitigate attacks.

18 Claims, 11 Drawing Sheets

(56) References Cited

U.S. PATENT DOCUMENTS

2015/0128263 A1* 5/2015 Raugas .............. H04L 63/1408
726/23
2015/0312273 A1 10/2015 Pappu et al.

OTHER PUBLICATIONS

Daswani, "Denial-of-Service (DOS) Attacks and Commerce Infrastructure in Peer-to-Peer Networks", PhD Thesis at Stanford, Nov. 2004, 311 pages.
Hasan, et al., "Approximate Semantic Matching of Heterogeneous Events", ACM, Jul. 16-20, 2012, 12 pages.
Lagutin et al., "Roles and Security in a Publish/Subscribe Network Architecture", IEEE, 2010, pp. 68-74.
Mirkovic, et al., "A Taxonomy of DDoS Attack and DDoS Defense Mechanisms", ACM, 15 pages, 2004.
Oke, et al., "Distributed Defense Against Denial of Service Attacks: A Practical View", BCS International Academic Conference 2008—Visions of Computer Science, 2008, pp. 153-162.
Pesonen, et al., "Secure Event Types in Content-Based, Multi-Domain Publish/Subscribe Systems", ACM, 2005, pp. 1-8.
Rothenberg, "Self-Routing Denial-of-Service Resistant Capabilities Using In-packet Bloom Filters", IEEE, Nov. 9-10, 2009, pp. 46-51.
Srivatsa, et al., "Secure Event Dissemination in Publish-Subscribe Networks", Technical Report, Georgia Institute of Technology, 22 pages, 2007.
Srivatsa, et al., "Securing Publish-Subscribe Overlay Services with EventGuard", ACM, Nov. 7-11, 2005, 10 pages.
Wang et al., "Security Issues and Requirements for Internet-Scale Publish-Subscribe Systems", Proceedings of the 35th Hawaiian International Conference on System Sciences 2002, IEEE, 8 pages.
Wun et al., "A Taxonomy for Denial of Service Attacks in Content-Based Publish/Subscribe Systems", ACM, Jun. 20-22, 2007, 12 pages.
Extended European Search Report for Application No. EP 17155470.2 dated Jun. 21, 2017, 7 pages.

* cited by examiner

US 10,333,968 B2

TECHNIQUES FOR DETECTING ATTACKS IN A PUBLISH-SUBSCRIBE NETWORK

BACKGROUND OF THE INVENTION

Field of the Invention

Embodiments of the present invention relate generally to intrusion detection systems and, more specifically, to techniques for detecting attacks in a publish-subscribe network.

Description of the Related Art

In a conventional publish-subscribe network, a group of publishers generate content that is communicated to a group of subscribers via a communication protocol. According to this protocol, publishers may publish content to specific topics, and subscribers may subscribe to certain topics. Particular subscribers receive content associated with the topics to which those subscribers have subscribed.

A convectional publish-subscribe network typically includes a network infrastructure that is designed to support the above communication protocol. Normally, this underlying network infrastructure is designed to be sufficiently robust to properly support a large number of publishers and a large number of subscribers, provided those publishers and subscribers operate in an expected manner. For example, the network infrastructure may be designed to support a given number of publishers provided each of those publishers does not publish more than a certain amount of content during a given time frame.

One problem with conventional network infrastructures is that these infrastructures are not typically designed to support communications between publishers and subscribers when publishers and/or subscribers operate in an unexpected and potentially malicious manner. Consequently, malicious behavior exercised by a particular publisher or subscriber can cripple the network infrastructure. For example, a malicious publisher could intentionally publish an extraordinarily large quantity of content within a very short timeframe and overwhelm the ability of the network infrastructure to properly communicate that content to the relevant subscribers. Generally, malicious publishers or subscribers can levy a wide variety of attacks on a given network infrastructure in order to overwhelm and cripple the network infrastructure. These types of attacks are collectively known as "denial of service" (DoS) attacks.

With increasingly large and complicated network infrastructures, publish-subscribe networks are increasingly at risk of DoS attacks. Further, due to the complexity of these networks, there are few, if any, effective solutions to detecting when DoS attacks are starting or are already in progress. Therefore, preventing imminent attacks or mitigating existing attacks on conventional network infrastructures is quite difficult.

As the foregoing illustrates, what is needed in the art are more effective approaches to detecting DoS attacks on network infrastructures.

SUMMARY OF THE INVENTION

Various embodiments of the present invention set forth a computer-implemented method for detecting a network attack, including generating a set of indicators that represents a current state of a network, generating a first probability that the network is subject to attack based on a first indicator included in the set of indicators, generating a second probability that the network is subject to attack based on a second indicator in the set of indicators, combining the first probability with the second probability to generate a third probability, determining that the third probability exceeds a first threshold value, and in response, dispatching a first handler configured to address the network attack.

At least one advantage of the disclosed approach is that denial of service attacks may be detected and managed based on continuous analysis of the state of the network infrastructure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
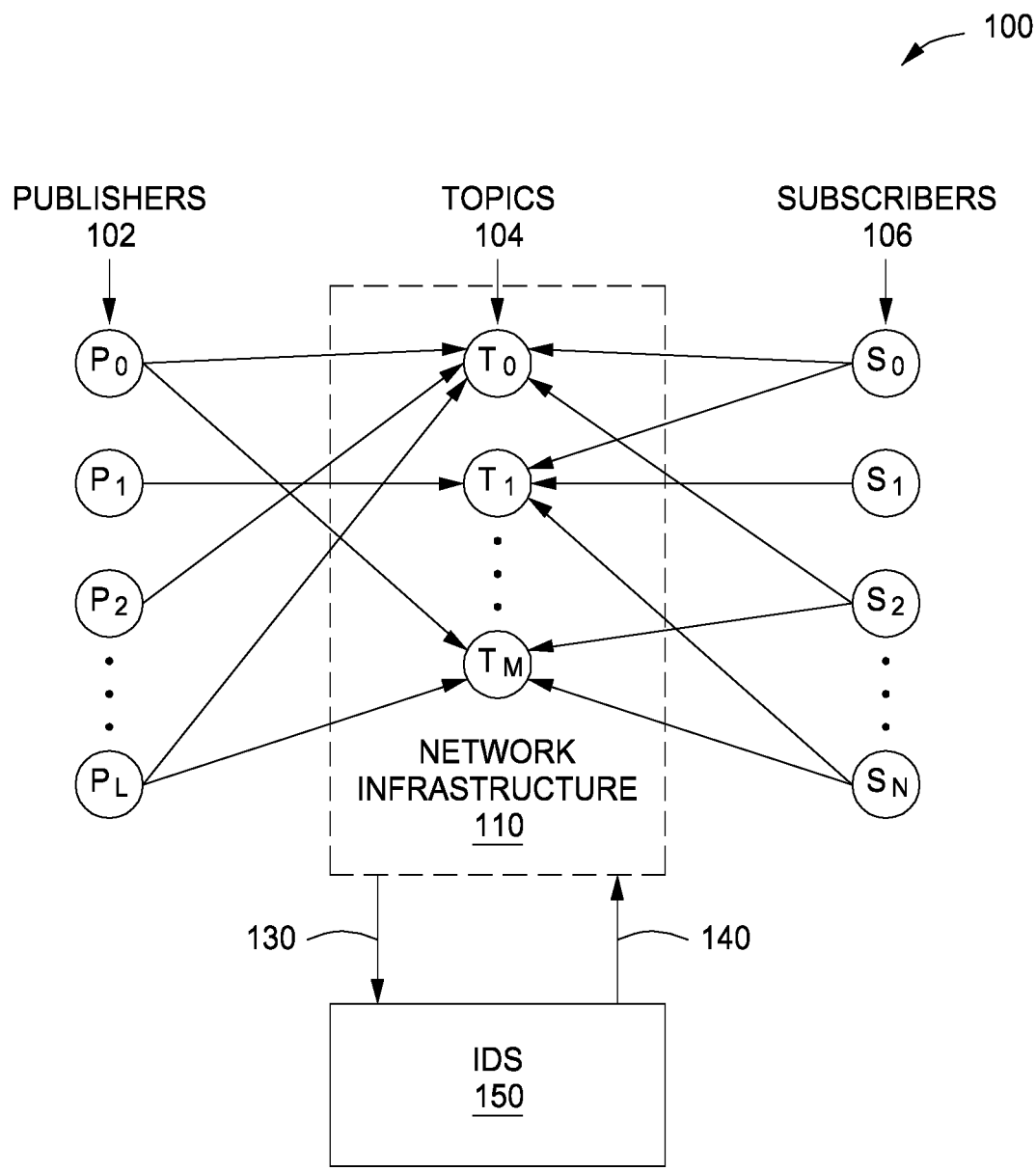
FIG. 1 illustrates a system configured to implement one or more aspects of the present invention.

FIG. 1 illustrates a system configured to implement one or more aspects of the present invention. As shown, publish-subscribe network 100 includes publishers 102, topics 104, and subscribers 106. Publishers 102 include individual publishers $P_0$ through $P_L$, topics 104 include individual topics $T_0$ though $T_M$, and subscribers 106 include individual subscribers $S_0$ though $S_N$. Publishers 102 are configured to publish content that is associated with individual topics 104. For example, publisher $P_L$ could publish content that is associated with topics $T_0$ and $T_M$. Subscribers 106 are configured to subscribe to content that is associated with individual topics 104. For example, subscriber $S_N$ could subscribe to topics $T_1$ and $T_M$.

Network infrastructure 110 includes various computing and communication resources that are collectively configured to facilitate the publish-subscribe architecture described above. Network infrastructure 110 could include, for example, routers configured to move traffic through publish-subscribe network 100, server machines configured to process and respond to requests, databases that cache content at various edge locations, message queues configured to queue messages exchanged via network infrastructure 110, and so forth.

Intrusion detection system (IDS) 150 is coupled to and/or integrated with network infrastructure 110. IDS 150 is configured to detect and respond to malicious attacks on network infrastructure 110. Such malicious attacks may take various forms. For example, a malicious publisher 102 could launch a denial of service (DoS) attack by publishing a large quantity of content to an inordinately wide range of topics 104. In this manner, the malicious publisher could potentially overwhelm the computing and communication resources of network infrastructure 110, thereby crippling or disabling publish-subscribe network 100 as a whole. Numerous other types of malicious attacks may also target network infrastructure.

IDS 150 is configured to detect such malicious attacks based on signals 130 received from network infrastructure 110. Signals 130 represent a collection of different measurements associated with the topology, architecture, and organization of network infrastructure 110. Signals 130 may also reflect operational parameters associated with the computing and communication resources within network infrastructure 110. Signals 130 may further describe the flow of information across network infrastructure 130. Generally, signals 130 broadly include any and all state-related information and/or flow-related information associated with network infrastructure 110. Based on signals 130, IDS 150 may initiate one or more actions 140 in response to a detected attack, as described in greater detail below in conjunction with FIG. 2.

Figure 2:
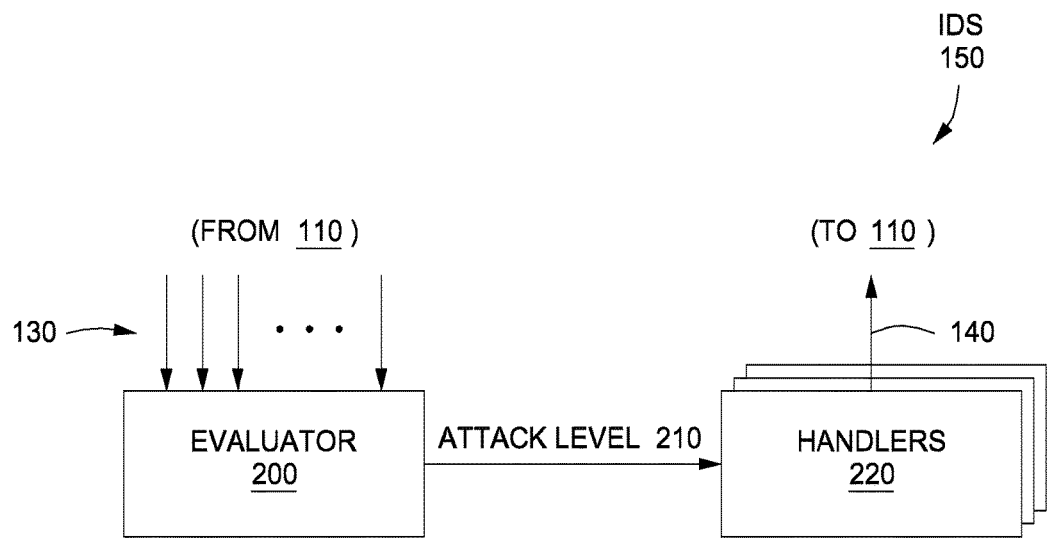
FIG. 2 is a more detailed illustration of the IDS of FIG. 1, according to various embodiments of the present invention.

FIG. 2 is a more detailed illustration of the IDS of FIG. 1, according to various embodiments of the present invention. As shown, IDS 150 includes an evaluator 200 coupled to a set of handlers 220. Each of evaluator 200 and handlers 220 may include computer hardware, computer software, or any technically feasible combination thereof.

In operation, evaluator 200 is configured to receive signals 130, process those signals, and then determine a level of attack associated with network infrastructure 110. The determined level of attack represents the likelihood that network infrastructure 110 is currently subject to a malicious attack. Evaluator 200 outputs the level of attack, shown as attack level 210, to handlers 220. Attack level 210 may have any particular granularity, although in practice, attack level 210 is typically one of "low," "medium," or "high." IDS 150 is configured to dispatch different handlers 220 in response to different attack levels 210.

For example, if evaluator 200 determines that attack level 210 is "medium," indicating a moderate likelihood that a malicious attack is in progress, then IDS 150 could dispatch a first handler 220 to initiate preventative actions 140 as a precautionary measure to avoid a complete denial of service. Alternatively, if evaluator 200 determines that attack level 210 is "high," indicating a strong likelihood that a malicious attack is in progress, then IDS 150 could dispatch a second handler 220 to initiate mitigating actions 140 as targeted countermeasures intended to thwart an existing denial of service. Handlers 220 are described herein for contextual purposes only. Evaluator 200, on the other hand, is described in greater details below in conjunction with FIGS. 3-9 and 11.

Evaluator Implementation

Figure 3:
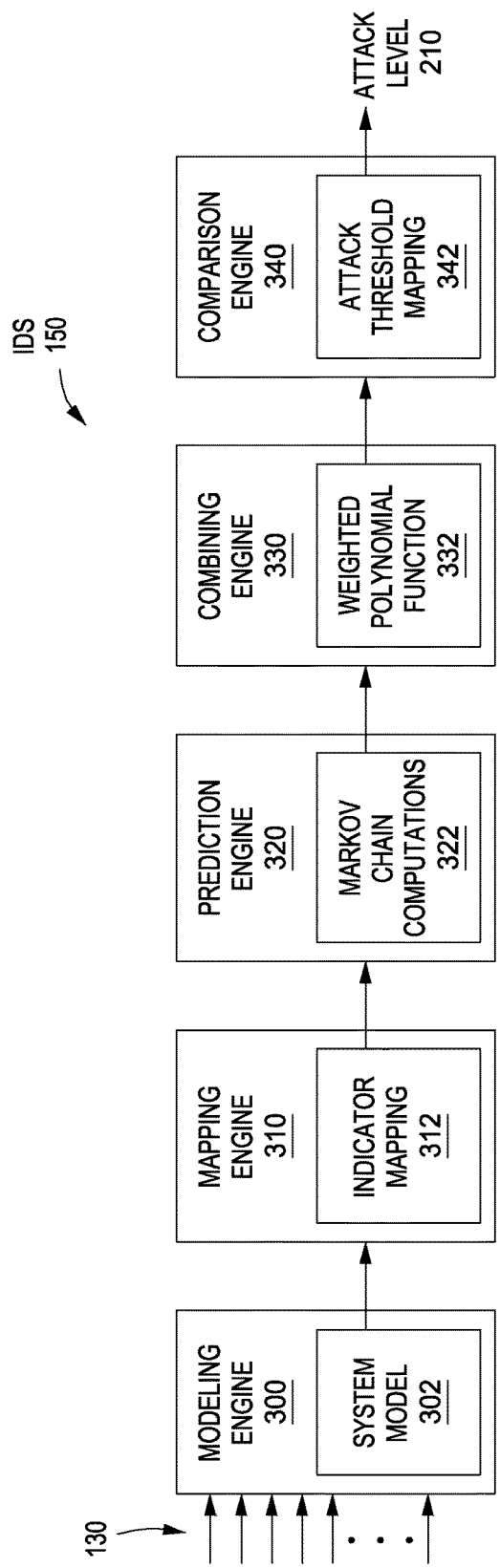
FIG. 3 is a more detailed illustration of the evaluator of FIG. 2, according to various embodiments of the present invention.

FIG. 3 is a more detailed illustration of the evaluator of FIG. 2, according to various embodiments of the present invention. As shown, evaluator 200 includes a modeling engine 300, a mapping engine 310, a prediction engine 320, a combining engine 330, and a comparison engine 340.

Modeling engine 300 is configured to generate system model 302 based on signals 130. System model 302 represents a current operational state of network infrastructure 110. The current operational state of network infrastructure 110 may be defined by a set of indicators that reflect different attributes of network infrastructure 110. System model 302 is described in greater detail below in conjunction with FIG. 4. Upon generating system model 302, modeling engine 300 transmits system model 302 to mapping engine 310.

Mapping engine 310 is configured to generate indicator mapping 312 based on system model 302. Indicator mapping 312 represents a mapping between each indicator described above to a different initial state vector of a Markov chain. Thus, indicator mapping 312 provides initial state vectors for a number of Markov chains that is equal to the number of indicators. Indicator mapping 312 is described in greater detail below in conjunction with FIG. 5. Upon generating indicator mapping 312, mapping engine 310 transmits indicator mapping 312 to prediction engine 320.

Prediction engine 320 is configured to perform Markov chain computations 322 based on indicator mapping 312. In doing so, prediction engine initializes a different Markov chain for each different indicator based on the corresponding initial state vector included in indicator mapping 312. Prediction engine 320 then performs one or more iterations with each Markov chain to determine a final state for each such chain. The final state for a given Markov chain indicates an estimated attack level associated with the corresponding indicator. Markov chain data 322 is described in greater detail below in conjunction with FIG. 6. Upon generating and iterating the aforementioned Markov chains, prediction engine 320 transmits the results of Markov chain computations 322 to combining engine 330.

Combining engine 330 is configured to evaluate a weighted polynomial function 332 based on the final states of the Markov chains included in Markov chain data 322. In doing so, combining engine 330 selects, for each Markov chain, the most probable final state of the chain, and then incorporates the probability associated with that state into weighted polynomial function 332. Combining engine 320 then evaluates weighted polynomial function 332 to determine a probability of attack ($P_{attack}$). Weighted polynomial function 332 is described in greater detail below in conjunction with FIG. 7. Upon evaluating weighted polynomial function 332, combining engine 320 transmits $P_{attack}$ to comparison engine 340.

Comparison engine 340 is configured to generate attack level 210 based on $P_{attack}$. Comparison engine 340 processes $P_{attack}$ via attack threshold mapping 342, and then identifies a set of thresholds between which $P_{attack}$ falls. Attack threshold mapping 342 is described in greater detail below in conjunction with FIG. 8. Upon generating attack level 210, comparison engine 340 transmits attack level 210 to handlers 220, as set forth above in conjunction with FIG. 2.

Figure 4:
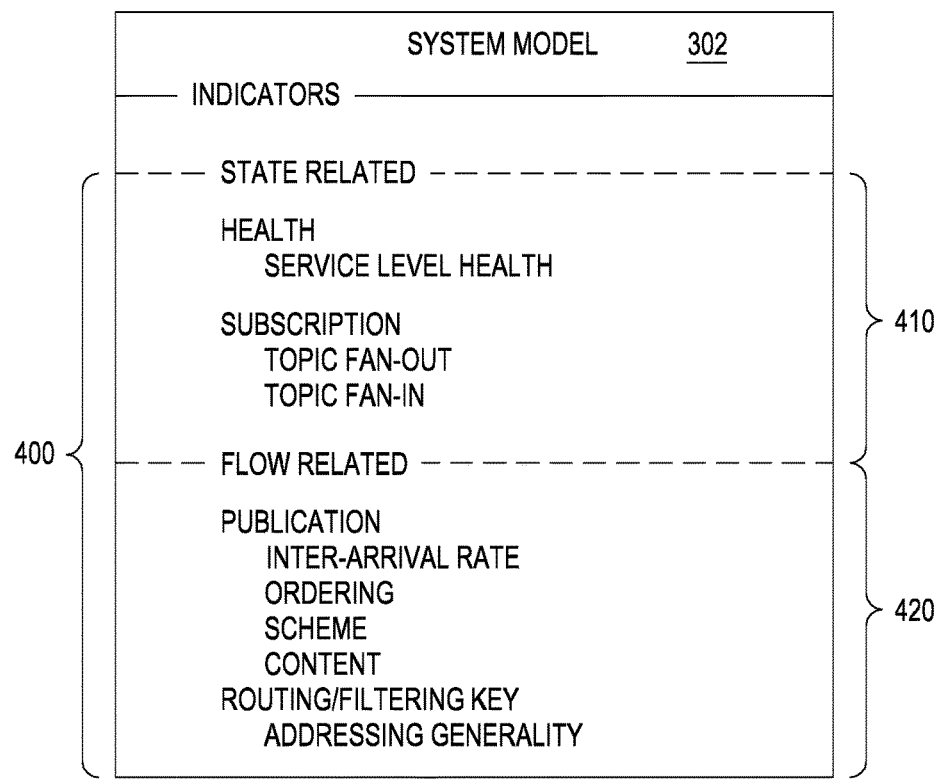
FIG. 4 is a more detailed illustration of the system model of FIG. 3, according to various embodiments of the present invention.

FIG. 4 is a more detailed illustration of the system model of FIG. 3, according to various embodiments of the present invention. As shown, system model 302 includes a set of indicators 400 that are divided into state-related indicators 410 and flow-related indicators 420. State-related indicators 410 represent the operational state of network infrastructure 110, including service level health, topic fan-in, and topic fan-out. Flow-related indicators 420 represent the overall flow of traffic through network infrastructure 110, including inter-arrival rate, ordering, scheme, content, and addressing generality.

Modeling engine 300 of FIG. 3 is configured to generate each of indicators 400 to include one or more time series of data derived from signals 130. For example, to generate a service level health indicator, modeling engine 300 could parse signals 130 to compile time-varying statistics associated with one or more server machines. Those statistics could reflect the CPU usage, I/O rate, and memory footprint of those server machines. At any given point in time, each indicator thus reflects a snapshot of a particular aspect of network infrastructure 110. Mapping engine 310 is configured to process system model 302 and to map each indicator 400, via indicator mapping 312, so a different initial state vector, as described below in conjunction with FIG. 5.

Figure 5:
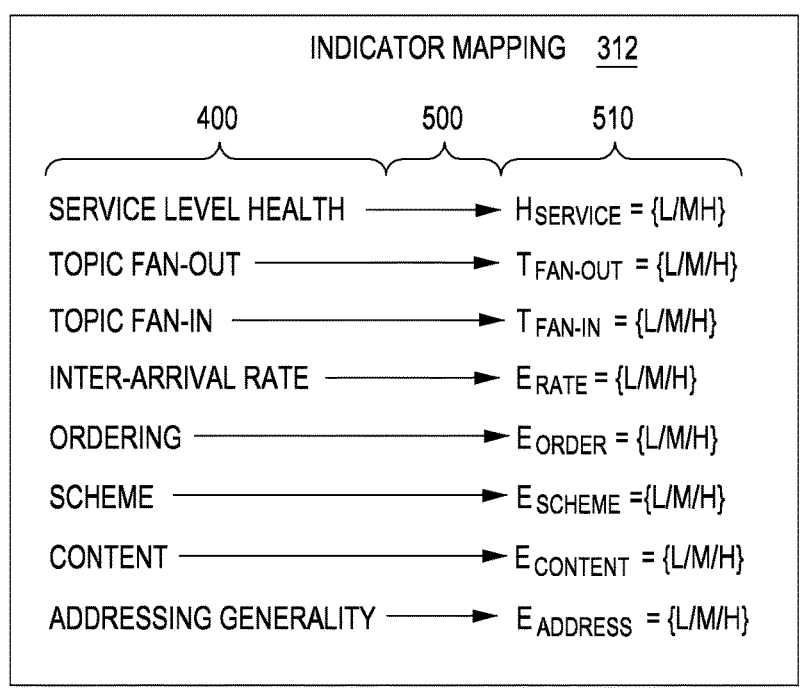
FIG. 5 is a more detailed illustration of the indicator mapping of FIG. 3, according to various embodiments of the present invention.

FIG. 5 is a more detailed illustration of the indicator mapping of FIG. 3, according to various embodiments of the present invention. As shown, indicator mapping 312 includes indicators 400 mapped, via transformations 500, to initial state vectors 510. Each initial state vector 510 includes a set of attack states associated with network infrastructure 110, and a probability value that network infrastructure 110 resides in each such attack state. In practice, the set of states includes "low," "medium," and "high" (shown as "{L|M|H}") which represent a low likelihood of attack, a medium likelihood of attack, and a high likelihood of attack.

Each transformation 500 is a function that converts the one or more values associated with a particular indicator 400 into a state vector 510 having a specific number of values (e.g., {L|M|H}). Because each indicator may include a different number of values, each transformation 500 may operate in a correspondingly different manner in order to produce initial state vectors 510, all of which have the same number of attack states and corresponding probability values. For example, a transformation 500 for an indicator 400 that includes just one value could include a 3×1 transformation matrix that, when multiplied by the indicator value, yields an initial state vector 510 having three probability values. Alternatively, a transformation 500 for an indicator 400 that includes three values could include a 3×3 transformation matrix that, when multiplied by the three values associated with the indicator, similarly yields an initial state vector 510 having three probability values. Transformations 500 may be determined empirically or via a supervised learning process, including, for example, machine learning, among other possibilities. Each initial state vector 510 represents an initial state of a Markov chain that is used by prediction engine 320 to model the overall attack level of network infrastructure 110, as described in greater detail below in conjunction with FIG. 6.

Figure 6:
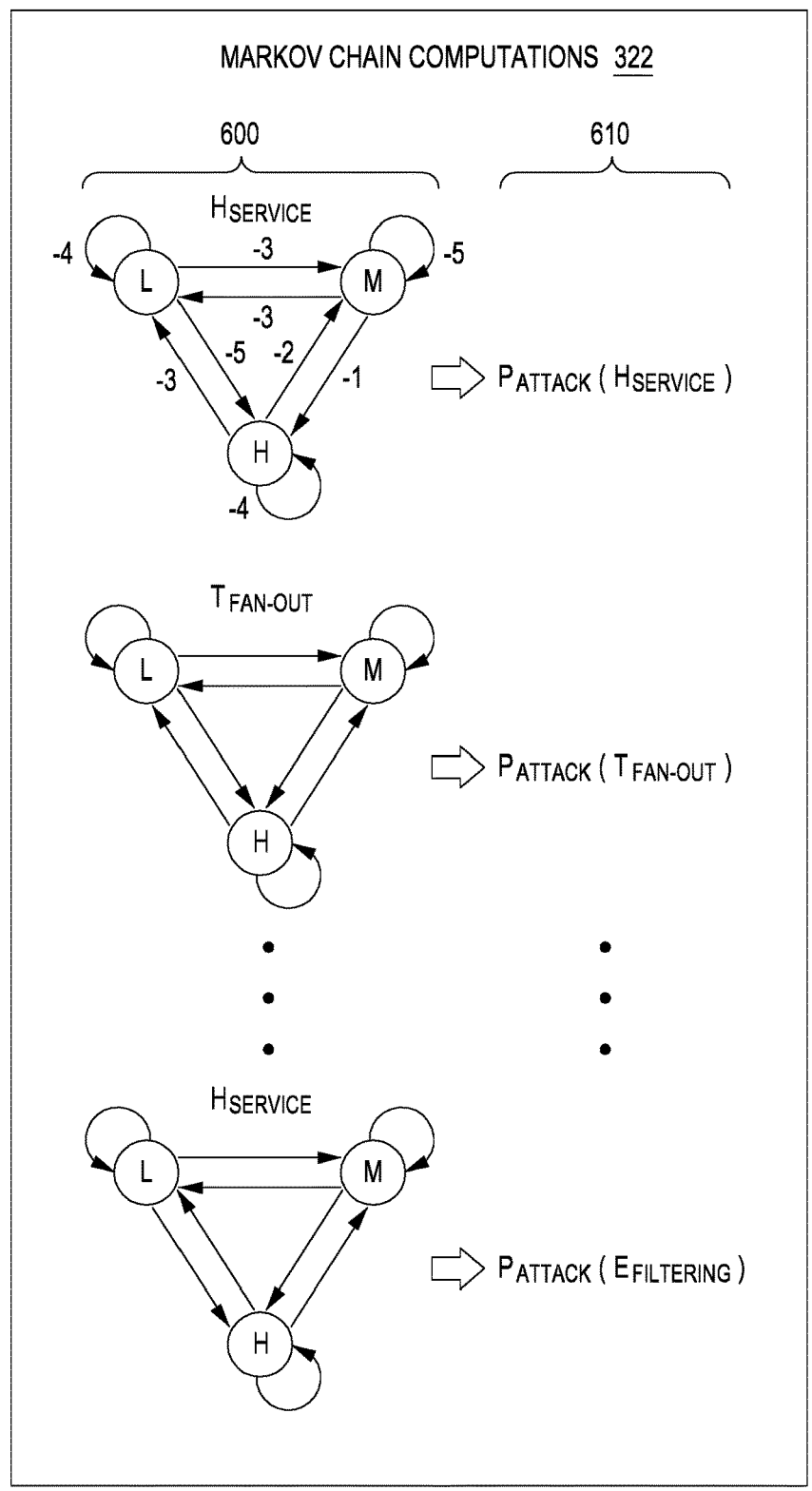
FIG. 6 is a more detailed illustration of the Markov chain computations of FIG. 3, according to various embodiments of the present invention.

FIG. 6 is a more detailed illustration of the Markov chain computations of FIG. 3, according to various embodiments of the present invention. As shown, Markov chain computations 322 include Markov chains 600 and various attack probabilities 610. Each Markov chain 600 corresponds to a different indicator 400 and represents a stochastic model of that indicator. For example, Markov chain 602 is a stochastic model of the $H_{service}$ indicator, also shown in FIG. 5. Markov chain 602 includes three states, L, M, and H, and various transition probabilities between those states. Each attack probability 610 is derived from a corresponding Markov chain 600 and represents a likelihood that network infrastructure 110 is under attack. For example, $P_{attack}(H_{service})$ represents a likelihood, derived from Markov chain 602, that network infrastructure 110 is under attack.

Prediction engine 320 is configured to generate attack probabilities 610 by performing one or more iterations with each Markov chain 600. For a given Markov chain 600, prediction engine 320 initializes the Markov chain based on the corresponding initial state vector 510 included in indicator mapping 312. Prediction engine 320 may then update initial state vector 510, during each iteration, based on the various transition probabilities associated with the Markov chain. In doing so, prediction engine 320 may implement a transition matrix that includes those transition probabilities. Prediction engine 320 multiplies initial state vector 510 by the transition matrix to produce a subsequent state vector associated with the Markov chain. Prediction engine 320 may perform this process iteratively, with each Markov chain 600, in order to predict the state of those Markov chains 600 at any future point in time. In this manner, prediction engine 320 can predict, for each indicator 400, a likelihood that network infrastructure 110 is under attack.

In practice, the above-described process yields three probabilities for each Markov chain 600: (i) the probability that network infrastructure 110 has a low likelihood of attack, (ii) the probability that network infrastructure 110 has a medium likelihood of attack, and (iii) the probability that network infrastructure 110 has a high likelihood of attack. For each Markov chain 600, prediction engine 320 is configured to identify the state having the highest probability, and to output the probability associated with that state. In this manner, prediction engine 320 can model hidden variables associated with network infrastructure 110. In one embodiment prediction engine 320 normalizes those probability values based on the associated state. For example, if a given Markov chain 600 predicts with 0.9 probability a "low" likelihood state, then prediction engine 330 could normalize this probability to a correspondingly low value. Prediction engine 320, upon performing Markov chain computations 322 in the manner described above, transmits the results of those Markov chain computations to combining engine 330 for further processing, as described below in conjunction with FIG. 7.

Figure 7:
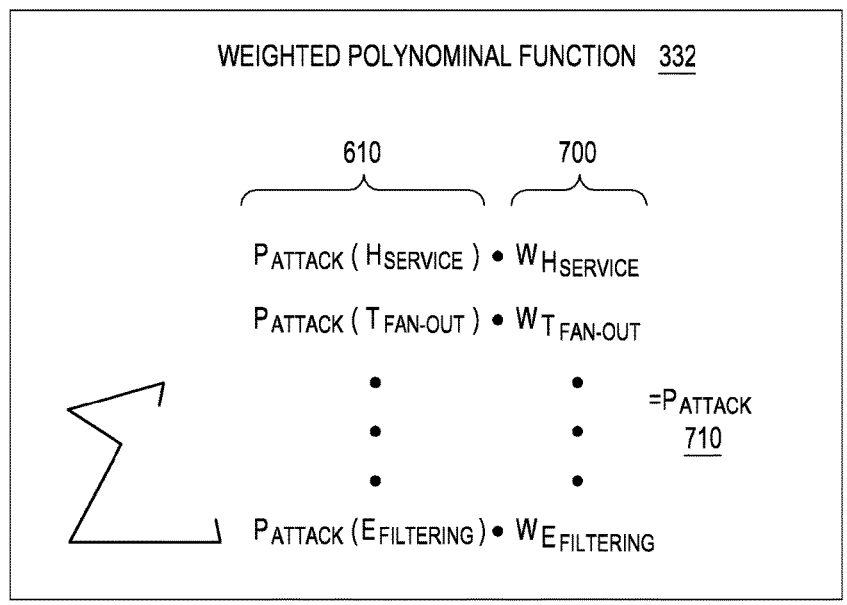
FIG. 7 is a more detailed illustration of the weighted polynomial function of FIG. 3, according to various embodiments of the present invention.

FIG. 7 is a more detailed illustration of the weighted polynomial function of FIG. 3, according to various embodiments of the present invention. As shown, weighted polynomial function 322 is computed based on attack probabilities 610 and weight values 700. Each attack probability 610 is associated with a different weight value 700. Weighted polynomial function 332 represents a weighted combination of attack probabilities 610. Weight values 700 may be determined empirically or via a supervised learning process. Combining engine 330 is configured to evaluate weighted polynomial function 332 in order to generate $P_{attack}$ 710. $P_{attack}$ 710 represents the overall likelihood that network infrastructure 110 is under attack. Upon evaluating weighted polynomial function 332 to generate $P_{attack}$ 710, combining engine 330 outputs $P_{attack}$ 710 to comparison engine 340, as described in greater detail below in conjunction with FIG. 8.

Figure 8:
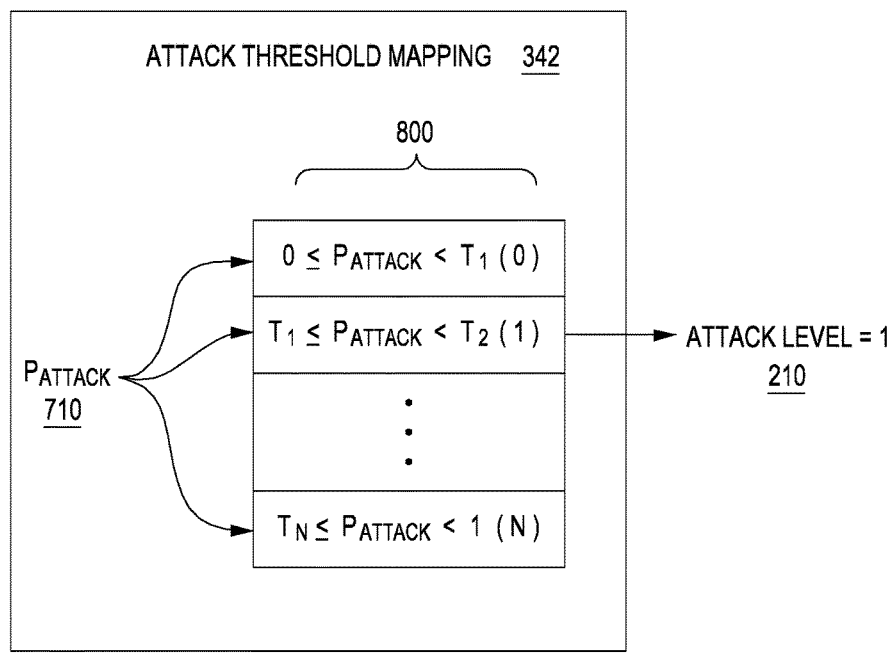
FIG. 8 is a more detailed illustration of the attack threshold mapping of FIG. 3, according to various embodiments of the present invention.

FIG. 8 is a more detailed illustration of the attack threshold mapping of FIG. 3, according to various embodiments of the present invention. As shown, attack threshold mapping 342 includes a set of threshold ranges 800, each of which sets forth an interval between two different attack thresholds. Each threshold is a decimal number between zero and one. Thus, each interval between thresholds represents a different range of decimal values between zero and one. Comparison engine 340 is configured to compare $P_{attack}$ 710 to threshold ranges 800 and to determine which threshold range $P_{attack}$ 710 falls within. Threshold ranges 800 typically represent attack states of network infrastructure 110, such as the "low," "medium," and "high" likelihood of attack states described previously. In FIG. 8, $P_{attack}$ 710 is shown to fall between thresholds T1 and T2, indicating a "medium" attack likelihood. Based on the comparison operation described herein, comparison engine 340 outputs attack range 210, as also shown in FIGS. 2-3.

Figure 9:
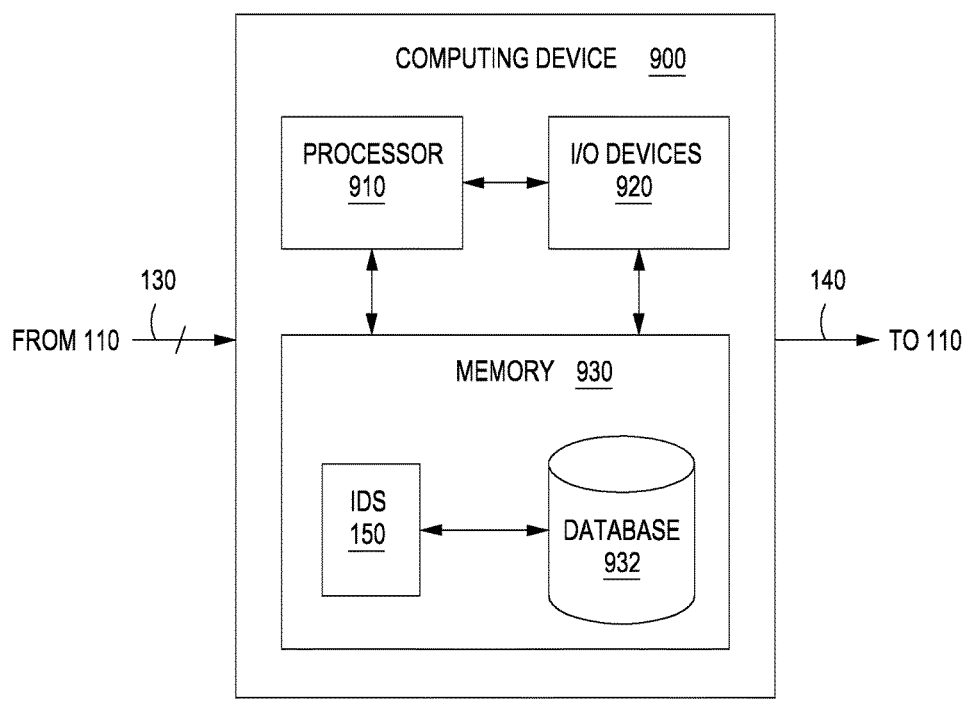
FIG. 9 illustrates an exemplary computing device configured to execute the IDS of FIG. 1, according to various embodiments of the present invention.

Referring generally to FIGS. 4-9, each of these figures outlines data that is processed by a specific engine included within evaluator 200. Each such engine may be implemented by computer hardware, computer software, or any technically feasible combination of the two. In some embodiments, certain processing engines of evaluator 200 are implemented in hardware, while others are implemented algorithmically in software. Generally, the processing engines of evaluator 200 are modular and the respective implementations are independent of one another. FIG. 9, described in greater detail below, sets forth a software-based implementation of IDS 150 and evaluator 200, included therein.

FIG. 9 illustrates an exemplary computing device configured to execute the IDS of FIG. 1, according to various embodiments of the present invention. As shown, computing device 900 includes processor 910, input/output (I/O) devices 910, and memory 920.

Processor 910 may be any technically feasible form of processing device configured process data and execute program code. Processor 910 could be, for example, a central processing unit (CPU), a graphics processing unit (GPU), an application-specific integrated circuit (ASIC), a field-programmable gate array (FPGA), and so forth. I/O devices 920 may include devices configured to receive input, including, for example, a keyboard, a mouse, and so forth. I/O devices 920 may also include devices configured to provide output, including, for example, a display device, a speaker, and so forth. I/O devices 920 may further include devices configured to both receive and provide input and output, respectively, including, for example, a touchscreen, a universal serial bus (USB) port, and so forth.

Memory 930 may be any technically feasible storage medium configured to store data and software applications. Memory 930 could be, for example, a hard disk, a random access memory (RAM) module, a read-only memory (ROM), and so forth. Memory 930 includes IDS 150 and database 932. In FIG. 9, IDS 150 is implemented as a computer-readable medium, such as an executable application. When executed by processor 910, IDS 150 performs any and all of the IDS-related operations previously described in conjunction with FIGS. 1-8, including generating attack level 210. In doing so, IDS 150 may implement software versions of the various processing engines included within evaluator 200, as shown in FIG. 3. Data associated with those processing engines, such as that described in conjunction with FIGS. 4-8, may be stored in database 932. Database 932 may also reside at another location that is accessible to IDS 150. Persons skilled in the art will recognize that the software implementation discussed in conjunction with FIG. 9 represents just one possible implementation of IDS 150, and that other implementations fall equally within the scope of the claimed embodiments.

Figure 10:
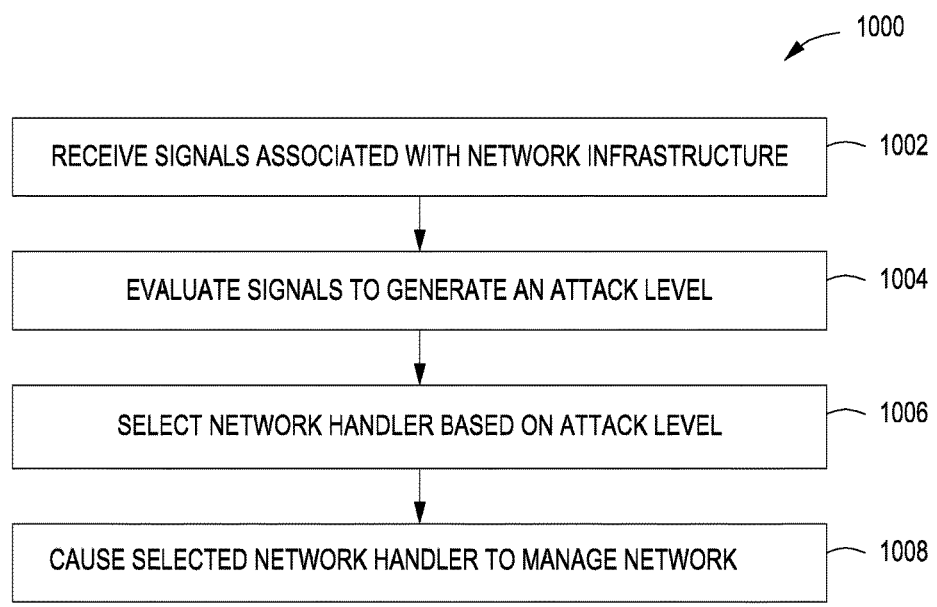
FIG. 10 is a flow diagram of method steps for responding to a possible attack on a network infrastructure, according to various embodiments of the present invention.
Figure 11:
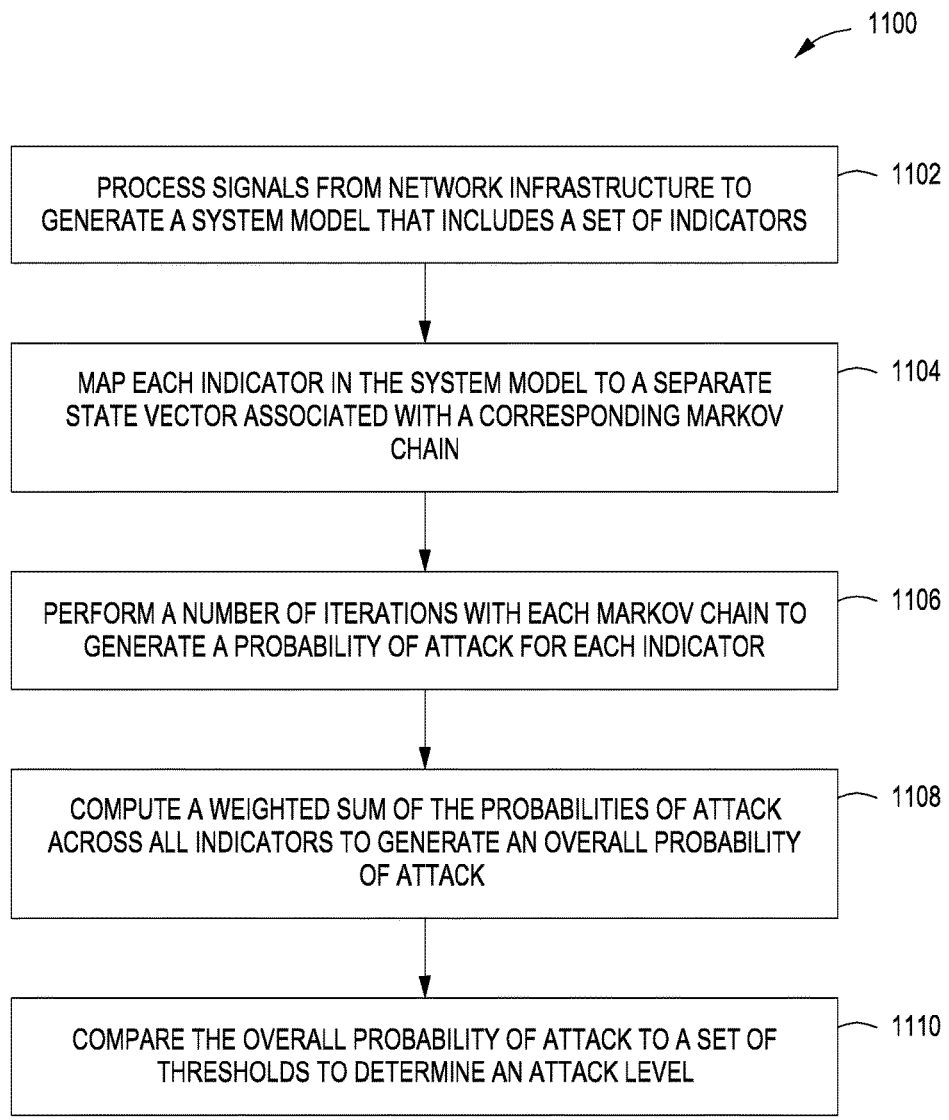
FIG. 11 is a flow diagram of method steps for determining a probability level associated with a possible attack on a network infrastructure, according to various embodiments of the present invention.

FIGS. 3-9, described above, set forth one exemplary implementation of evaluator 200 included within IDS 150. These figures are intended to detail the various elements of evaluator 200 for illustrative purposes. FIGS. 10-11, described below, set forth various procedures implemented by IDS 150 and evaluator 200 in performing the various operations described this far.

Procedures Implemented within Intrusion Detection System

FIG. 10 is a flow diagram of method steps for responding to a possible attack on a network infrastructure, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1000 begins at step 1002, where IDS 150 shown in FIG. 1-2 receives signals 130 associated with network infrastructure 110. Signals 130 generally include any and all time-varying signals produced within or produced based on network infrastructure 100. Signals 130 could include signals related to the operating state of network infrastructure 100, or signals related to the flow of information across network infrastructure 130, among other possibilities.

At step 1002, IDS 150 implements evaluator 200 to evaluate signals 130 at a given point in time and determine attack level 210 associated with network infrastructure 100. The determined attack level 210 reflects the probability that a malicious attack is currently in progress within network infrastructure 110. In practice, attack level 210 may assume levels such as "low," "medium," or "high," although other granularities are also possible.

At step 1004, IDS 150 selects one of handlers 220 based on attack level 210. For example, when the attack level is "medium," IDS 150 could select a preventative handler 220 to safeguard network infrastructure 110 against possible malicious attacks. Alternatively, when the attack level is "high," IDS 150 could select a mitigating handler 220 to specifically target a known intrusion. At step 1006, IDS 150 dispatches the selected handler to manage network infrastructure 110.

FIG. 11 is a flow diagram of method steps for determining a probability level associated with a possible attack on a network infrastructure, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1100 begins at step 1102, where modeling engine 302 within evaluator 200 processes signals 130 from network infrastructure to generate system model 302 that includes a set of indicators 400. In doing so, modeling engine 300 may generate each of indicators 400 to include one or more time series of data derived from signals 130. At any given point in time, each indicator thus reflects a snapshot of a particular aspect of network infrastructure 110.

At step 1104, mapping engine 310 within evaluator 200 maps each indicator 400 in system model 302 to an initial state vector 510 associated with a corresponding Markov chain. Each initial state vector 510 includes a set of states associated with network infrastructure, and a probability value that network infrastructure 110 resides in each such state. In practice, the set of states includes "low," "medium," and "high" (shown as "{L|M|H}") which represent a low probability of attack, a medium probability off attack, and a high probability of attack.

At step 1106, prediction engine 320 within evaluator 200 performs a number of iterations with the Markov chain for each indicator, initialized based on the corresponding initial state vector 510, to generate a probability of attack based on each such indicator. For a given Markov chain, prediction engine 320 may iterate the Markov chain any number of times or iterate the chain until a steady state is reached. Prediction engine 320 evaluates each Markov chain and identifies the most probable state (e.g., {L|M|H}), and then outputs this data to combining engine 330.

At step 1108, combining engine 330 within evaluator 200 computes a weighted sum of the attack probabilities 610 for each indicator to generate an overall probability of attack, $P_{attack}$ 710. In doing so, combining engine 330 evaluates weighted polynomial function 332 described above in conjunction with FIG. 7. $P_{attack}$ 710 represents the overall probability that network infrastructure 110 is under attack. Upon evaluating weighted polynomial function 332 to generate $P_{attack}$ 710, combining engine 330 outputs $P_{attack}$ 710 to comparison engine 340.

At step 1110, comparison engine 340 compares $P_{attack}$ 710 to a set of threshold ranges 800 to determine attack level 210. Comparison engine 340 compares $P_{attack}$ 710 to threshold ranges 800 and determines which threshold range $P_{attack}$ 710 falls within. Threshold ranges 800 typically represent states of network infrastructure 110, such as the "low," "medium," and "high" likelihood of attack, as described previously.

As described in conjunction with FIGS. 1-3 and 8-9, evaluator 200 outputs attack level 210 to handlers 220 shown in FIG. 2. Handlers 220 may then address any potential attacks based on attack level 210.

In sum, a publish-subscribe network includes a network infrastructure configured to support the exchange of data. An intrusion detection system is coupled to the network infrastructure and configured to process signals received from that infrastructure in order to detect malicious attacks on the network infrastructure. The intrusion detection system includes an evaluator that generates a set of indicators based on the received signals. The evaluator models these indicators as stochastic processes, and then predicts an attack probability for each indicator based on a predicted future state of each such indicator. The evaluator combines the various attack probabilities and determines an overall attack level for the network infrastructure. Based on the attack level, the intrusion detection system dispatches a specific handler to prevent or mitigate attacks.

At least one advantage of the disclosed approach is that denial of service attacks may be detected and managed based on continuous analysis of the state of the network infrastructure. With highly complex publish-subscribe networks, the disclosed approach yields faster and more accurate results relative to conventional network monitoring techniques that can thus reduce the efficacy of malicious attacks, thereby preserving network operations. Additionally, the techniques described herein can be applied to process a very large quantity of data in a very short amount of time, without the need for continuous oversight. Such quantities of data may include millions or billions of data points that, without the computer-based approaches discussed herein, could not be adequately processed to identify potential attacks.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for detecting a network attack in a publish-subscribe network, the method comprising:
   generating a current system model that represents a current state of the publish-subscribe network, the current system model including:
      a set of state-related indicators representing an operational state of the publish-subscribe network, wherein the set of state-related indicators includes at least one of a topic fan-in or a topic fan-out, and
      a set of flow-related indicators representing an overall traffic flow through the publish-subscribe network;
   generating a first probability that the publish-subscribe network is subject to attack, based on a first indicator included in the set of state-related indicators;
   generating a second probability that the publish-subscribe network is subject to attack, based on a second indicator in the set of flow-related indicators;
   combining the first probability with the second probability to generate a third probability;
   determining that the third probability exceeds a first threshold value; and
   in response, dispatching a first handler configured to address the network attack.

2. The computer-implemented method of claim 1, further comprising:
   receiving a set of signals from the publish-subscribe network; and
   parsing the set of signals to identify one or more subsets of signals in the set of signals, wherein each subset of signals corresponds to a different indicator in one of the set of state-related indicators or the set of flow-related indicators.

3. The computer-implemented method of claim 1, wherein generating a first probability that the publish-subscribe network is subject to attack comprises:
   mapping the first indicator to an initial state vector;
   initializing a stochastic model of the first indicator based on the initial state vector;
   computing one or more transitions of the stochastic model to determine a final set of states of the stochastic model; and
   determining a final state in the final set of states of the stochastic model based on a final probability of the final state.

4. The computer-implemented method of claim 3, wherein the stochastic model of the first indicator includes a Markov chain comprising:
   a set of states initialized to represent the initial state vector; and
   a set of transition probabilities for transitioning between each state in the set of states.

5. The computer-implemented method of claim 3, wherein computing a transition of the stochastic model comprises multiplying a state vector associated with the stochastic model by a transition matrix to generate a subsequent state vector for the stochastic model.

6. The computer-implemented method of claim 1, wherein combining the first probability with the second probability comprises computing a weighted sum of the first probability and the second probability to generate the third probability.

7. The computer-implemented method of claim 1, wherein the third probability represents an overall likelihood that the publish-subscribe network is subject to attack.

8. The computer-implemented method of claim 1, further comprising:
   comparing the third probability to a second threshold value; and
   determining that the third probability does not exceed the second threshold value, indicating that the publish-subscribe network has a first pre-defined probability of being subject to attack, wherein the first handler is configured to address the network attack by preventing a denial of service from occurring.

9. The computer-implemented method of claim 1, further comprising:
   comparing the third probability to a second threshold value; and
   determining that the third probability exceeds the second threshold value, indicating that the publish-subscribe network has a first pre-defined probability of being subject to attack, wherein the first handler is configured to address the network attack by mitigating a denial of service that is currently underway.

10. One or more non-transitory computer-readable media including instructions that, when executed by one or more processors, cause the one or more processors to detect a network attack in a publish-subscribe network, by performing the steps of:
    generating a current system model that represents a current state of the publish-subscribe network, the current system model including:
       a set of state-related indicators representing an operational state of the publish-subscribe network, and
       a set of flow-related indicators representing an overall traffic flow through the publish-subscribe network, wherein the set of flow-related indicators includes at least one of an inter-arrival rate, a scheme, and an addressing generality;
    generating a first probability that the publish-subscribe network is subject to attack based on a first indicator included in the set of state-related indicators;
    generating a second probability that the publish-subscribe network is subject to attack based on a second indicator in the set of flow-related indicators;

combining the first probability with the second probability to generate a third probability;
determining that the third probability exceeds a first threshold value; and
in response, dispatching a first handler configured to address the network attack.

11. The one or more non-transitory computer-readable media of claim 10, wherein generating the set of indicators comprises:
receiving a set of signals from the publish-subscribe network; and
parsing the set of signals to identify one or more subsets of signals in the set of signals, wherein each subset of signals corresponds to a different indicator in one of the set of state-related indicators or the set of flow-related indicators.

12. The one or more non-transitory computer-readable media of claim 10, wherein generating a first probability that the publish-subscribe network is subject to attack comprises:
mapping the first indicator to an initial state vector;
initializing a stochastic model of the first indicator based on the initial state vector;
computing one or more transitions of the stochastic model to determine a final set of states of the stochastic model; and
determining a final state in the final set of states of the stochastic model based on a final probability of the final state.

13. The one or more non-transitory computer-readable media of claim 12, wherein mapping the first indicator to the initial state vector comprises converting one or more values associated with the first indicator into one or more initial states associated with the initial state vector via a transformation function.

14. The one or more non-transitory computer-readable media of claim 13, wherein the transformation function is determined based on:
a supervised learning process; or an empirical analysis of the publish-subscribe network.

15. The one or more non-transitory computer-readable media of claim 12, wherein computing a transition of the stochastic model comprises multiplying a state vector associated with the stochastic model by a transition matrix to generate a subsequent state vector for the stochastic model.

16. The one or more non-transitory computer-readable media of claim 10, wherein combining the first probability with the second probability comprises computing a weighted sum of the first probability and the second probability to generate the third probability.

17. A system for detecting a network attack in a publish-subscribe network, comprising:
a memory that includes an intrusion detection application; and
a processor that is coupled to the memory and, when executing the intrusion detection application, is configured to:
generate a current system model that represents a current state of the publish-subscribe network, the current system model including:
a set of state-related indicators representing an operational state of the publish-subscribe network, and
a set of flow-related indicators representing an overall traffic flow through the publish-subscribe network, wherein the set of flow-related indicators includes at least one of an inter-arrival rate, a scheme, and an addressing generality,
generate a first probability that the publish-subscribe network is subject to attack based on a first indicator included in the set of state-related indicators,
generate a second probability that the publish-subscribe network is subject to attack based on a second indicator in the set of flow-related indicators,
combine the first probability with the second probability to generate a third probability,
determine that the third probability exceeds a first threshold value, and
in response, dispatch a first handler configured to address the network attack.

18. The system of claim 17, wherein the third probability represents an overall likelihood that the publish-subscribe network is subject to attack.

* * * * *